United States Patent [19]

Kervagoret

[11] 4,249,455
[45] Feb. 10, 1981

[54] HYDRAULIC SERVO-MECHANISM

[75] Inventor: Gilbert Kervagoret, Argenteuil, France

[73] Assignee: Societe Anonyme DBA, Paris, France

[21] Appl. No.: 952,742

[22] Filed: Oct. 19, 1978

[51] Int. Cl.³ .............................................. F15B 9/10
[52] U.S. Cl. ........................................ 91/383; 91/368; 91/466; 137/625.69
[58] Field of Search ................... 91/383, 368, 466; 137/625.69; 251/294; 74/25, 37, 480 B

[56] References Cited

U.S. PATENT DOCUMENTS

| | | | |
|---|---|---|---|
| 2,761,285 | 9/1956 | Beecroft | 91/383 X |
| 3,280,842 | 10/1966 | Weisenbach | 137/625.69 X |
| 3,528,454 | 9/1970 | Lewis | 137/625.69 |

FOREIGN PATENT DOCUMENTS

| | | | |
|---|---|---|---|
| 15024 | 2/1904 | Austria | 251/294 |
| 67537 | 8/1915 | Austria | 251/294 |

*Primary Examiner*—Irwin C. Cohen

*Attorney, Agent, or Firm*—Paul David Schoenle; Ken C. Decker

[57] ABSTRACT

Hydraulic servo-mechanism having a housing in which is defined a cavity with an input member and an output member mounted coaxial therein and each supporting a single sprocket. In a bore of the housing having its axis perpendicular to that of the input and output members, a distribution spool is slidably disposed, with push rod and means facing its respective ends for imparting movement thereto. A double sprocket is rotatably mounted at each outer end of the respective push rod means. The housing rotatably supports another double sprocket which is disposed in substantially the same plane as the sprockets of the input and output members. A first chain meshes with the sprocket of the input member and a first set of the teeth of each of the double sprockets. A second chain meshes with the sprocket of the output member and a second set of the teeth of each of the double sprockets. The distribution spool controls fluid flow towards the compartments of a fluid motor for providing a power assistance to movement of the output member.

8 Claims, 3 Drawing Figures

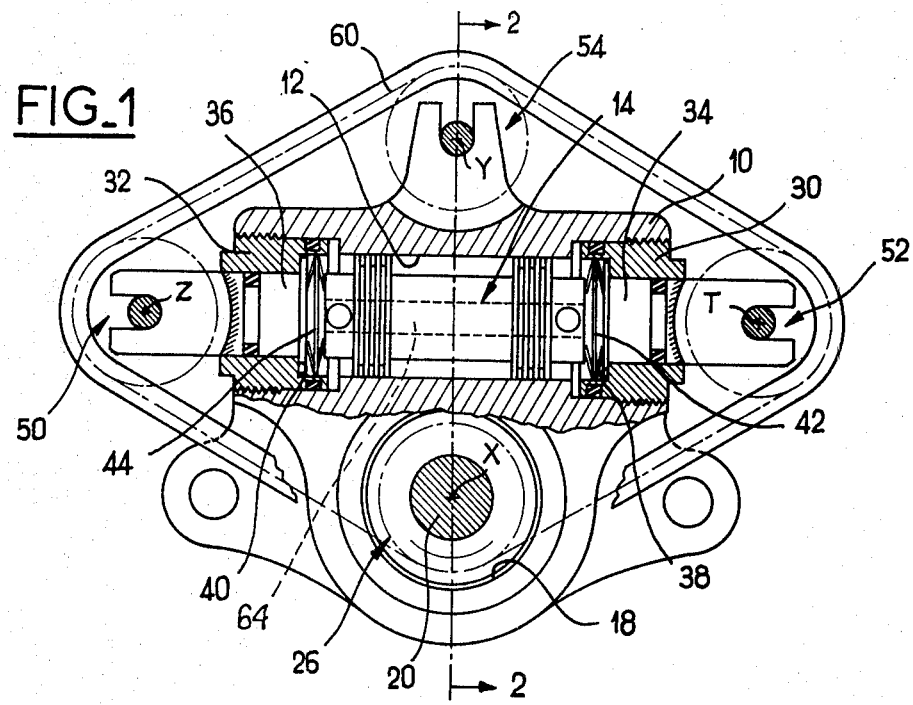
FIG_1
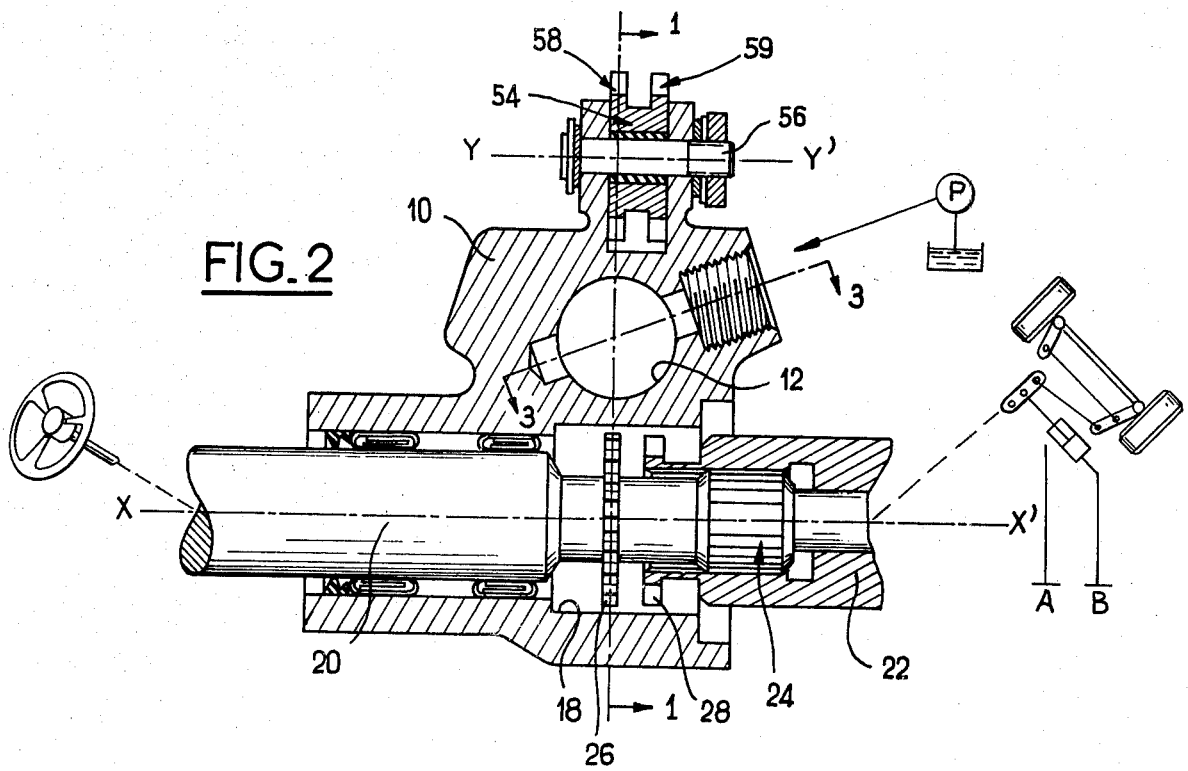
FIG_2

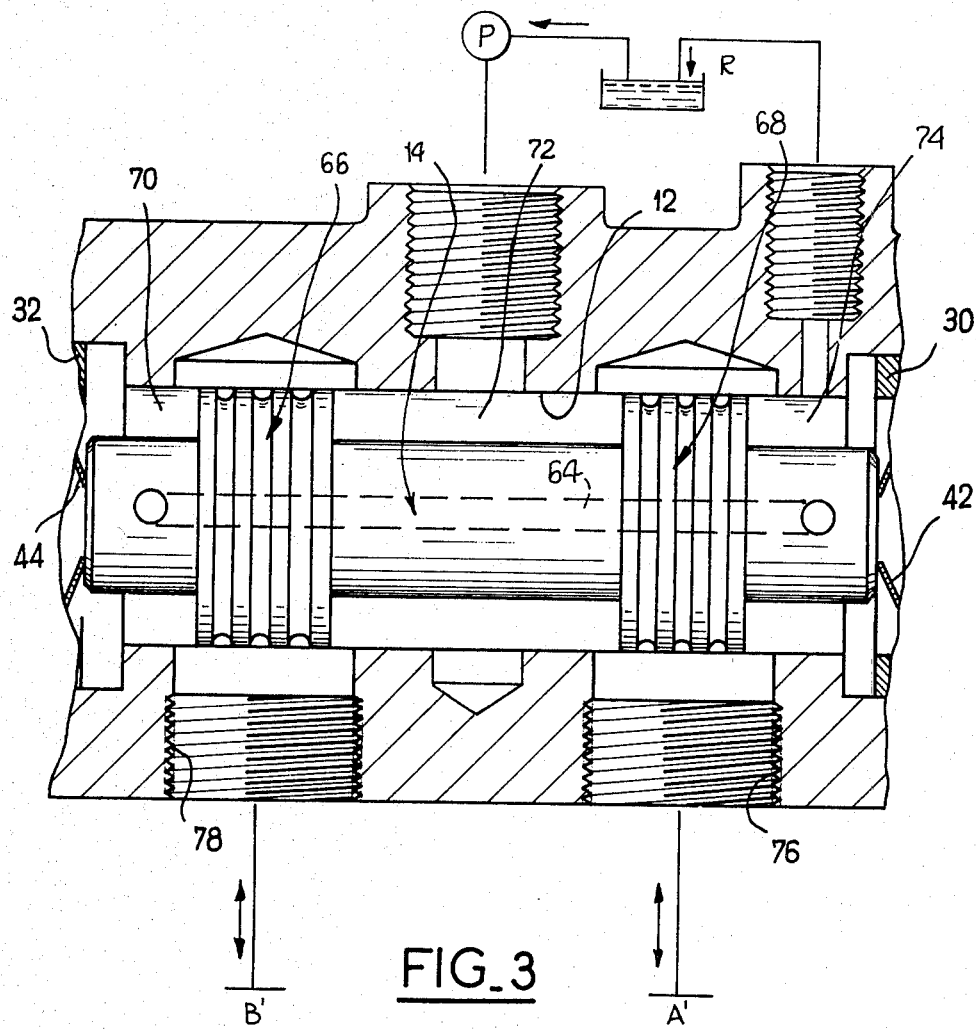
FIG_3

HYDRAULIC SERVO-MECHANISM

The invention relates to a hydraulic servo mechanism, more particularly for a motor vehicle steering system.

Known servo mechanisms, particularly those for the power steering of vehicles, have a housing with an input member and an output member which are coaxial and are resiliently connected. The mechanism also has a distributing spool which responds to a rotary operating force applied to the input member by moving in a given direction or in the opposite direction, depending upon the direction of rotation of the operating force. The purpose of the spool is to distribute the fluid between the two compartments of a hydraulic servo actuator, in order to generate a motive force as a result of the pressure exerted on the opposite sides of the piston of the actuator.

The conversion of the rotary motion of the input member into translatory motion of the spool is generally performed by systems of the screw and nut type.

However, this arrangement presents a number of problems during operation, especially as regards the take-up of play and as regards friction.

An object of the invention is to propose a hydraulic servo mechanism in which the device for converting rotary motion of the input shaft into translatory motion of the distributing spool is of novel design and will reduce the disadvantages mentioned above.

The hydraulic servo mechanism according to the invention comprises a housing containing a cavity. An input member extends into the cavity, to which rotary motion can be imparted by an operator. An output member is also disposed in the cavity coaxial with the input member and capable of transmitting the said motion applied to the input member. The input and output members are resiliently connected. The mechanism comprises a hydraulic servo actuator supplied from a pressure source by way of a distribution control valve. The control valve is a spool slidable in a bore of the housing having its axis perpendicular to that of the input and output members. The hydraulic actuator is capable of providing a force assisting the motion transmitted by the output member. Each end of the distribution spool is situated opposite a corresponding push rod means slidably mounted and coaxial with the bore. Each push rod means has a portion which projects from the bore and which rotatably supports a respective first and second rotary driving members. The axis of the first and second rotary driving members are parallel to the axis of the input and output members. The housing also rotatably supports a third rotary driving member having its axis, also parallel to the axis of the input and output members. The plane defined by the axis of the input and output members and by the axis of the third driving member is perpendicular to the plane defined by the first and second rotary driving members. A first endless transmission member is mounted under tension to cooperate operatively for rotary movement with the input member and the first, third and second driving members. A second endless transmission member is also mounted under tension to cooperate operatively for rotary movement with the output member and the first, third and second members.

According to a preferred embodiment of the invention, a first single sprocket is fixed to the input shaft and a second single sprocket is fixed to the output shaft and the first, second and third driving members comprising double sprockets of which each has a first set of teeth situated in the same plane as the first single sprocket and a second set of teeth situated in the same plane as the second single sprocket. The first endless transmission member comprises a chain which meshes with the first single sprocket and with the first sets of teeth of the first, third and second double sprockets. The second endless transmission member comprises a chain which meshes with the second sprocket and the second sets of teeth on the first, third and second double sprockets.

The invention will now be described with reference to the accompanying drawings, in which:

FIG. 1 represents a section through part of a hydraulic servo mechanism embodying the invention;

FIG. 2 represents a section along a line 2—2 in FIG. 1 and schematically illustrates the invention in a vehicle steering apparatus; and FIG. 3 shows a detail of the distributor, partly in section along a line 3—3 in FIG. 2, the distributor being designed by way of example for use in an open-centre hydraulic system of the four-way type.

With reference to FIGS. 1 and 2, the drawings illustrate part of the servo mechanism embodying the invention as applied to a power steering system for a motor vehicle. A housing 10 contains a bore 12 in which a distributing spool 14 is slidable. The spool 14 is designed to control fluid flow between a pressure source pump 46 and a reservoir R on the one hand and the compartments of a hydraulic actuator 48 on the other, in a manner described in more detail below. The housing 10 contains a bore defining a cavity 18 which houses an input member or shaft 20 and an output member or shaft 22, these shafts being coaxial. The input shaft 20 fits with radial clearance a blind hole in the output shaft 22. The shafts 20, 22 bear conventional teeth generally designated 24, which cooperate to limit their relative angular deflection. Inside the cavity 18, a sprocket 26 is coaxial with and rigidly connected to the shaft 20, and a sprocket 28 is coaxial with and rigidly connected to the output shaft 22.

The bore 12 is closed at each end by a plug 30, 32. Each plug contains a stepped hole of which the portion of larger diameter faces into the bore. Each hole slidably receives in a fluid-tight manner a push rod forming element 34, 36, which is in the form of a plunger and of which a portion of larger diameter, or head, can bear on a shoulder 38, 40 in the stepped hole to define th idle position of the push rod-forming element. Between the head of each push rod and the associated end of the distributing spool 14 there are resilient means 42, 44, in this case washers, which urge the push rods into the above-mentioned idle positions and also serve to centre the spool 14 of the distributor. From their idle position, therefore, the push rods can move in one direction only: inwards into the bore 12. The push rods more independently of one another. Note also that the plugs can be screwed in or out to adjust their axial positions and consequently the idle positions of the push rods.

The push rods 34, 36 project from the holes in the plugs 30, 32 and support at their respective ends rotary driving members 50, 52 of which the axes ZZ' and TT' are perpendicular to the axis of the bore 12 and are parallel to the axis XX' of the input and output shafts 20, 22. A third rotary driving member 54 is slidably mounted and therefore adjustable in a groove in the housing 10. The axis YY' of the driving member 54 is parallel to the axes of the input and output shafts 20, 22 and of the driving members 50, 52, and the plane passing through the axes XX' and YY' is perpendicular to the plane passing through the axes ZZ' and TT'.

In the preferred embodiment of the invention herein described, the driving members 50, 52 and 54 comprise double sprockets, that is, sprockets of which each has two juxtaposed sets of teeth and which thereby establish a driving connection between the roller chains 60, 62 at each of the driving member 50, 52 and 54. For example, sprocket 54, which is shown in detail in FIG. 2 with its pivot pin 56, has a first set 58 of teeth and a second set 59 of teeth. The double sprockets 50, 52 and 54 are mounted so that their first sets of teeth and the single sprocket 26 fixed to the input shaft are in substantially the same plane, and their second sets of teeth and the single sprocket 28 are also substantially in a single plane.

A first endless transmission member 60 of the roller chain type (not shown) is mounted under moderate tension to mesh with the first single sprocket 26 and with the first sets of teeth on the first, third and second entraining sprockets 50, 54, 52, in that order. Similarly, a second endless transmission member 62, also of the roller chain type, is mounted under moderate tension to mesh with the second single sprocket 28 and with the second sets of teeth on the first, third and second sprockets. It will be understood that because the roller chains 60, 62 are relatively inelastic in tension, the moderate tension in the chains 60, 62 is established by adjusting the positions of the push rods 34 and 36 and their associated sprockets 50 and 52 relative to the housing 10 by screwing the plugs 30 and 32 in or out so that the heads of the push rods abut the shoulders 38 and 40 and so that the chains have no slack in them. The resilient washers 42 and 44 maintain the push rod heads in abutment with the shoulders of the plugs 30 and 32. Note that in FIG. 2 the servo mechanism is illustrated without the first and second endless transmission members.

The distributing spool 14 (FIG. 3) comprises a piston with two bearing surfaces 66, 68 cooperating with the bore 12 to divide the latter into three compartments 70, 72 and 74. The compartments 70, 74 communicate with one another through a hole in the piston and communicate also with the low-pressure reservoir R. The compartment 72 communicates with the hydraulic pump 46 for supplying pressure fluid. The housing also contains working orifices 76, 78 communicating with the compartments of the hydraulic actuator 48 via the connections AA' and BB' (FIGS. 2 and 3). In the idle position, the distributing spool occupies the position shown in FIG. 3, in which the bearing surfaces are situated opposite the working orifices 76, 78, which then communicate with the reservoir and high pressure source so that a medium pressure is established. Those skilled in the art will understand that the idle position of the spool 14 relative to housing 10 is established by screwing one of the plugs 30 and 32 into the housing and screwing the other plug an equal amount out of the housing so that the adjustment of the roller chains 60 and 62 described above is maintained and so that the pressures in the chambers of actuator 48 are equal. If the spool moves in either direction, its bearing surfaces cooperate with the working orifices to create in a known manner a pressure difference between the two orifices, that is, between the two compartments of the hydraulic actuator.

The device just described operates as follows: If a torque is applied to the input shaft 20, for example clockwise in FIG. 1, the sprocket 26 is rotated. However, because the sprocket 28 fixed to the output shaft 22 and to the steering apparatus and actuator 48, it remains stationary. Consequently, due to the presence of the roller chain 62, the sprockets 50, 54 cannot be rotated. The rotary motion applied to the input shaft 20 and transmitted by the first chain 60 creates a tension in the span of chain 60 between the sprocket 26 and sprocket 52 which exceeds the moderate tension established in the chains 60 and 62 and which increased tension generates a longitudinal force applied to the push rod 34, so that it begins to move from right to left in FIG. 1, compressing the resilient washers 42. The washers 42 then fulfil the same role as a torsion bar in a rotary power steering valve, by generating an opposing return torque. During movement of the push rod 34 to the left, on the other hand, the sprocket 52 turns slightly as a result of rotation of the chain 60 caused by movement of the sprocket 52 relative to the housing 10. However, this does not cause the chain 62 to rotate round the sprockets 28, 50 and 52 because the sprocket 28 is still stationary relative to the housing 10. Compression of the resilient washers 42 causes spool 14 to shift to the left from its idle position. The movement of the distributing spool leads to a pressure difference in the compartments of the hydraulic actuator 48, which rotates the steering apparatus. As a result the sprocket 28 and chain 62 are now rotated, and the sprockets 50, 52, and 54 are now released for rotation.

The rotary motion proceeds in the manner described above; continued rotation of the steering wheel and sprocket 26 causing the chains 60 and 62 to rotate around the housing 10 and a slight angular offset being maintained between the sprockets 26 and 28 so that the spool 14 is displaced from its idle position and the actuator 48 continues to provide an assist to the steering apparatus to rotate in the sense of steering wheel rotation.

If rotation of the steering wheel connected to the input shaft is stopped, the rotation of sprocket 26 is stopped also. However, the sprocket 28 continues to rotate under the influence of actuator 48 until the angular offset between the sprocket 28 and sprocket 26 is eliminated, whereupon the tensions in the chains 60 and 62 are restored to their moderate idle values and push rod 34 and spool 14 return to their idle position.

Although the embodiment just described comprises rotary entraining members of the double sprocket type cooperating with roller chains, the invention is not restricted to this embodiment. In particular, the sprockets in the embodiment described could readily be replaced by pulleys cooperating with transmission belts, without exceeding the scope of the invention.

Similarly, the invention is not restricted to an open-centre hydraulic servo device comprising a distributor of the four-way type, as illustrated, that is, a distributor controlling the flow of fluid between two supply orifices, respectively communicating with a high-pressure and a low-pressure sources, and two working orifices connected to the compartments of the hydraulic actuator. On the contrary, the invention is equally applicable to an open-centre hydraulic servo device comprising a distributor of the three-way type, that is, one in which one compartment of the hydraulic actuator communicates directly with the pump whereas the other communicates with the single working orifice of the distributor. Also, the invention applies equally well to a closed-centre hydraulic servo device, in which the distributor is normally closed and opens the flow path from the accumulator to the compartments of an actuator when a force is applied to the operating shaft.

What I claim is:

1. A hydraulic servo-mechanism comprising:
    a housing having a cavity defined therewithin,
    a rotatable input member extending into the cavity and operable by an operator,
    a rotatable output member extending into the cavity, said output member being coaxial with said input member and being capable of rotating in response to operation of said input member,
    a bore being defined in said housing and having an axis perpendicular and transverse to that of the input and output members,
    a fluid motor, in fluid flow communication with said bore,
    a distribution control valve being slidably mounted for reciprocation in said bore for controlling fluid flow between a pressure source and said fluid motor, said fluid motor being drivingly connected to said output member for providing a force assisting rotary motion of the latter,
    first and second push rod means aligned with and slidably mounted in said bore, each push rod means having a first end situated opposite a corresponding end of said distribution control valve, and a second end projecting outside of said bore,
    first and second driving elements rotatably mounted at the respective second ends of the first and second push rod means, said elements having their axes parallel to the axis of said input and output members,
    a third driving element rotatably mounted on the housing, said third element having an axis parallel to that of the input and output members,
    a first endless transmission member mounted under tension to cooperate operatively for rotative movement with the input member and the first, third and second driving elements,
    a second endless transmission member mounted under tension to cooperate operatively for rotative movement with the output member and the first, third and second driving elements.

2. Hydraulic servo-mechanism according to claim 1, wherein the plane defined by the axis of the third driving element and the axis of the input and output members is substantially perpendicular to the plane defined by the axes of the first and second driving elements.

3. Hydraulic servo-mechanism according to claim 1, wherein a first single sprocket is fixed to the input member, and a second single sprocket is fixed to the output member
    said first, second and third driving elements being each comprised of a double sprocket having a first set of teeth situated in the same plane as the first single sprocket and a second set of teeth situated in the same plane as the second single sprocket,
    said first endless transmission member comprising a chain in meshing engagement with the first single sprocket and with the first sets of teeth of the first, third and second double sprockets,
    said second endless transmission member comprising a chain in meshing engagement with the second single sprocket and with the second sets of teeth of the first, third and second double sprockets.

4. Hydraulic servo-mechanism according to claim 1, wherein said distribution control valve is a spool, resilient return means being inserted between each end of the spool and the facing ends of the respective push rod means.

5. Hydraulic servo-mechanism according to claim 4, wherein said housing comprises stop means defined in said bore, each of said push rod means comprising abutment means urged against one corresponding of the stop means, under the influence of said resilient means, to define the respective idle positions of said push rod means.

6. Hydraulic servo-mechanism according to claim 5, said stop means being formed of annular shoulders of the bore.

7. Hydraulic servo-mechanism according to claim 1, wherein the axis of the input and output members and the axis of the third driving elements are respectively situated on opposite sides of the plane defined by the axes of the first and second driving elements.

8. Hydraulic servo-mechanism according to claim 5, and means for adjusting the positions of said stop means relative to said housing, whereby the position of the axes of the first and second driving members is adjustable relative to said housing.

* * * * *